United States Patent
Delaplace et al.

(10) Patent No.: US 7,281,683 B2
(45) Date of Patent: Oct. 16, 2007

(54) PROCESS FOR AIDING THE TAKEOFF OF AN AIRCRAFT

(75) Inventors: Franck Delaplace, Toulouse (FR); Gérard Mathieu, Pibrac (FR); Nicolas Daniel, Paris (FR)

(73) Assignee: Airbus France, Toulouse (FR)

( * ) Notice: Subject to any disclaimer, the term of this patent is extended or adjusted under 35 U.S.C. 154(b) by 73 days.

(21) Appl. No.: 11/111,927

(22) Filed: Apr. 22, 2005

(65) Prior Publication Data

US 2005/0242235 A1    Nov. 3, 2005

(30) Foreign Application Priority Data

Apr. 28, 2004 (FR) .................................. 04 04494

(51) Int. Cl.
*B64C 13/00* (2006.01)

(52) U.S. Cl. .................................. 244/75.1

(58) Field of Classification Search .............. 244/87, 244/221, 225; 701/4, 8, 15
See application file for complete search history.

(56) References Cited

U.S. PATENT DOCUMENTS

| | | | | |
|---|---|---|---|---|
| 3,138,353 | A * | 6/1964 | Steiner | 244/87 |
| 3,691,356 | A * | 9/1972 | Miller | 701/15 |
| 3,949,958 | A * | 4/1976 | Richter | 244/227 |
| 4,043,523 | A * | 8/1977 | Bartoe, Jr. | 244/87 |
| 4,099,687 | A * | 7/1978 | Roberts et al. | 244/7 R |
| 4,261,533 | A * | 4/1981 | Roberts et al. | 244/7 R |
| 4,908,619 | A * | 3/1990 | Bala et al. | 340/966 |
| 6,453,221 | B2 * | 9/2002 | Burson | 701/3 |
| 6,546,317 | B2 * | 4/2003 | Bousquet | 701/15 |
| 6,643,568 | B2 * | 11/2003 | Chatrenet et al. | 701/15 |
| 2003/0004621 | A1 | 1/2003 | Bousquet | |
| 2004/0260434 | A1 * | 12/2004 | Zammit-Mangion et al. | 701/15 |

FOREIGN PATENT DOCUMENTS

EP    1273986    1/2003

OTHER PUBLICATIONS

"arbitrary" The American Heritage® Dictionary of the English Language (2003). Retrieved Oct. 12, 2006, from xreferplus. http://www.xreferplus.com/entry/4062074.*
"ALL Airplanes Are Low-Speed Airplanes" Hange, Craig, NASA Quest, May 15, 2000 http://quest.arc.nasa.gov/people/journals/aero/hange/ls.html.*
Preliminary Search Report dated Nov. 3, 2004 with English translation.

* cited by examiner

*Primary Examiner*—Tuyet Phuong Luu
*Assistant Examiner*—Joseph W Sanderson
(74) *Attorney, Agent, or Firm*—Stevens, Davis, Miller & Mosher, LLP

(57) ABSTRACT

An aircraft takeoff process may include applying a pitch command deflecting an adjustable horizontal tailplane of the aircraft by a predetermined angle. Thereafter, the pitch command is corrected in accordance with the deviation between a takeoff rotation speed and a stall reference speed VRref of the aircraft.

14 Claims, 4 Drawing Sheets

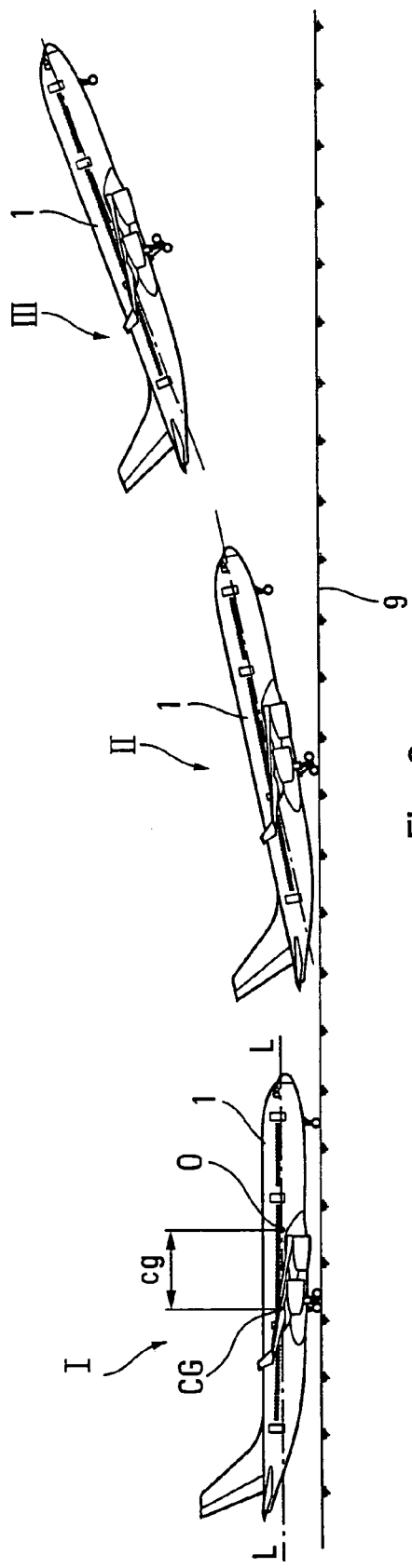
Fig. 2
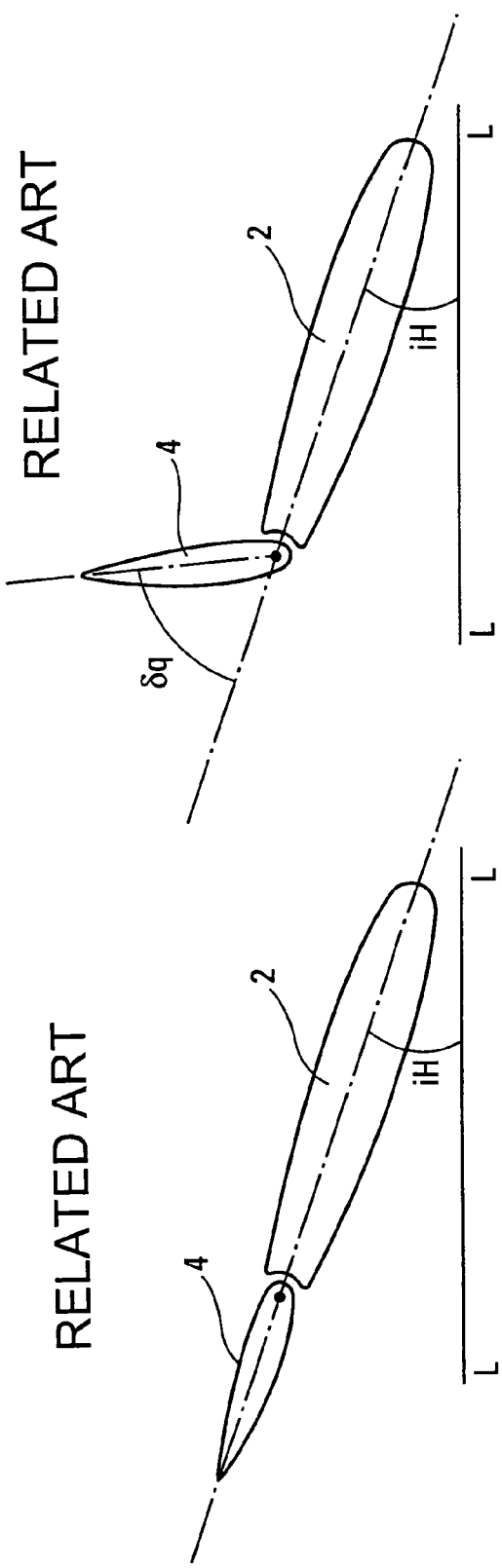
Fig. 3A RELATED ART
Fig. 3B RELATED ART

PROCESS FOR AIDING THE TAKEOFF OF AN AIRCRAFT

FIELD OF THE INVENTION

The present invention relates to a process for aiding the takeoff of an aircraft allowing the behavior of said aircraft to be made uniform during takeoff rotations and making it possible to eliminate, or at the very least to reduce, the influence of variations of certain parameters of the aircraft, such as mass, configuration of the leading edge slats and of the trailing edge flaps, thrust, speed at the moment of rotation, etc.

BACKGROUND OF THE RELATED ART

It is known that certain aircraft comprise a stabilizing horizontal tailplane that can be adjusted in inclination. An adjustable horizontal tailplane such as this is, in the art, designated by one or other of the abbreviations PHR (standing for Plan Horizontal Reglable (i.e., adjustable)) or THS (standing for Trimmable Horizontal Stabilizer). Just like a fixed horizontal tailplane, an adjustable horizontal tailplane is provided with elevators forming the trailing edge of said adjustable horizontal tailplane.

An adjustable horizontal tailplane can be deflected in the nose-up or nose-down direction and it is used in certain flight phases. For example, during the takeoff of the aircraft and prior to rotation, it is customary to deflect said adjustable horizontal tailplane through action of the pilot or of an automatic system, by an angle of deflection of predetermined value. The theoretical optimal value of the angle of deflection of the adjustable horizontal tailplane depends on several parameters of the aircraft, such as the longitudinal position of the center of gravity, the total weight on takeoff, the configuration of the leading edge slats and of the trailing edge flaps, the thrust, the speed of rotation, etc.

The actual value of the angle of deflection is significant since it conditions the behavior of the airplane during the rotation phase, which begins when, the aircraft having through its run reached a predetermined value of speed, the so-called rotation speed, the pilot pulls on the stick so as to actuate said elevators in the nose-up direction and which finishes when the attitude of the aircraft is stabilized around a predetermined value, for example equal to 15°. If the actual value of this angle of deflection is too nose-up, it may lead to spontaneous takeoff without intervention from the pilot or a possible tail touch or else, on the contrary, if it is too nose-down, an arduous takeoff penalizing the performance of the aircraft.

As a general rule, on takeoff, the value of the angle of deflection of the adjustable horizontal tailplane corresponds to a nose-up moment, this being the case in particular when the center of gravity of the aircraft occupies a forward longitudinal position toward the nose of the aircraft: specifically, in this case, the aircraft is difficult to turn at the moment of rotation and the adjustable horizontal tailplane must create a high nose-up moment. However, when the center of gravity of the aircraft is in a rear longitudinal position, the aircraft tends to turn very easily and the adjustable horizontal tailplane must create only a small pitching moment, which may be nose-up, or even nose-down.

As recalled hereinabove, the optimal theoretical value of the angle of deflection, on takeoff, of the adjustable horizontal tailplane depends on numerous parameters. Hence, for an accurate adjustment of the inclination of said adjustable horizontal tailplane, it is necessary to take account of the totality, or at least a large number, of these parameters, thereby leading to complicated adjustment devices.

SUMMARY OF THE INVENTION

The present invention is aimed at remedying this drawback.

To this end, according to the invention, the process for aiding the takeoff of an aircraft comprising trailing edge flaps and leading edge slats, as well as an adjustable horizontal tailplane to which are hinged elevators, in which process:

a value VR of speed of the aircraft, the so-called rotation speed, at which the takeoff rotation must begin is predetermined, said value VR having to lie in a range of values of speed imposed by regulatory provisions; and a pitch command for aiding takeoff deflecting said adjustable horizontal tailplane by an angle whose value is predetermined is applied to said aircraft, is noteworthy in that:

in said range of speed values, a reference speed VRref is chosen arbitrarily and, for this reference speed VRref, the value of the angle of deflection of said adjustable horizontal tailplane is determined solely as a function of the longitudinal position of the center of gravity of said aircraft on takeoff;

the deviation existing between said rotation speed VR and said reference speed VRref is determined; and said pitch command for aiding takeoff is corrected as a function of said speed deviation.

Thus, according to the present invention, the angle of deflection of the adjustable horizontal tailplane is rendered dependent on only one of the abovecited parameters, namely the longitudinal position of the center of gravity of the aircraft, also referred to as the "centering" which turns out to be the most significant. One thus obtains a great simplification of the device for adjusting the deflection of said adjustable horizontal tailplane.

Of course, the value of said angle of deflection thus obtained is merely a simplified compromise value which could have the consequence that, from one takeoff to another, the behavior of the aircraft on rotation would be different, since one or more of the parameters that are not taken into account by this compromise value varies (vary), and this would disturb the pilot and might lead to a ground touch by the tail of the aircraft.

However, this drawback is avoided according to the invention on account of the fact that the rotation speed VR results from a takeoff optimization computation for the aircraft which takes account both of the characteristics of said aircraft (mass, thrust, configuration of the slats and flaps, etc.) and the characteristics of the runway (length, altitude, condition, temperature, etc.), so that the correction envisaged by the present invention as a function of the deviation between VR and VRref—this reference value VRref being the same from one takeoff to another—allows the behavior of the aircraft on takeoff to be made uniform by eliminating or at least reducing the influence of the variations of the parameters that are not taken into account.

Thus, the present invention makes it possible to implement a simplified compromise value for the angle of deflection of said adjustable horizontal tailplane, avoiding the complications engendered by taking into account numerous parameters involved in the theoretical value of this angle of deflection and allowing the behavior of the aircraft to be made uniform during its successive takeoffs.

The correction of said pitch command for aiding takeoff may be obtained by the action either of said adjustable horizontal tailplane, or of said elevators, or else in part by action of said adjustable horizontal tailplane and in part by action of said elevators.

Furthermore, said speed deviation existing between said values VR and VRref may be estimated either by their ratio, or by their difference.

Since, in a general manner, for an equal effect, the pitch command for an aircraft on takeoff must be all the more nose-down the higher the speed of the latter, it follows that, if the rotation speed VR is greater than the reference speed VRref, the correction of said pitch command for aiding takeoff must give rise to a nose-down action and that, conversely, if the rotation speed VR is less than said reference speed VRref, the correction of said pitch command for aiding takeoff must engender an increase in the nose-up action, said correction being zero when the rotation speed VR is equal to the reference speed VRref.

To simplify the implementation of the invention and so as not to have to make corrections of pitch command for aiding takeoff other than in the direction corresponding to a decrease of the nose-up action, the minimum speed of the rotation speed range in which said actual rotation speed must lie in order to comply with the regulatory provisions is advantageously chosen as reference speed VRref.

This minimum value, and hence the reference speed VRref, may then be equal to the product $K \times VS1g$, in which K is a coefficient greater than 1 and $VS1g$ is the speed at which said aircraft stalls when it is flying horizontally with a configuration of the leading edge slats and of the trailing edge flaps which is similar to that used for takeoff.

It will be noted that the lifting equation at the stalling speed $VS1g$ may be written $$M \times g = 0.5 \times \rho \times (VS1g)^2 \times Czmax \times S$$

In which expression M is the mass of the aircraft, g the acceleration due to gravity, $\rho$ the density of the air, Czmax the maximum coefficient of lift and S the reference area. It follows from this equation that the stalling speed $VS1g$ depends on the mass of the aircraft, the altitude (through the density $\rho$), the configuration of the slats and the flaps (through the coefficient Czmax) and the longitudinal position of the center of gravity of the aircraft (also through the coefficient Czmax).

Furthermore, the coefficient K of the product $K \times VS1g$ depends on the ratio of the thrust of the aircraft on takeoff to the weight of said aircraft. It therefore depends indirectly on the altitude and the temperature (through the thrust) and the mass of the aircraft. The mean value of the coefficient K is of the order of 1.11.

Although, as mentioned hereinabove, the deviation existing between said values VR and VRref may be estimated by their ratio, it is most particularly advantageous that it be estimated by their difference, of the type VR−VRref, that is to say $VR - K \times VS1g$ by taking account of the above feature.

Specifically, the difference $VR - K \times VS1g$ indicates in advance whether the rotation of the aircraft will be fast or arduous (the nose-up moment generated by the adjustable horizontal tailplane and the elevators depends on the square of the speed at the moment of rotation) and therefore makes it possible to act accordingly. If the actual rotation speed VR is equal to the reference rotation speed $K \times VS1g$, then the difference $VR - K \times VS1g$ is zero and no correction of the pitch command for aiding takeoff is implemented. On the other hand, if the actual rotation speed VR is greater than the reference rotation speed $K \times VS1g$, the difference $VR - K \times VS1g$ is positive and comes in as a parameter for tailoring the pitch aid on takeoff to said rotation speed VR.

Thus, in the case where the adjustable horizontal tailplane is implemented, said predetermined value of the angle of deflection of the latter is increased by an additional angle $\Delta iH$, positive or zero, of the type $$\Delta iH = K1 \times (VR - K \times VS1g)$$

in which expression K1 is a coefficient dependent on the reference speed VRref, the longitudinal position of the center of gravity and the configuration of the trailing edge flaps and of the leading edge slats, the coefficient K1 possibly exhibiting, for example, a mean value of the order of 0.16 degrees of angle per knot of speed.

Likewise, if the elevators are implemented, the latter are nose-up deflected by an additional angle $\delta q2$ (positive or zero) whose value is of the type $$\delta q2 = K2 \times (VR - K \times VS1g)$$

in which expression K2 is a coefficient also dependent on the reference speed VRref, the longitudinal position of the center of gravity and the configuration of the trailing edge flaps and of the leading edge slats.

If, for the aircraft considered, the adjustable horizontal tailplane is n times more effective, as regards the pitch command, than said elevators, K2 is chosen to be n times greater than K1.

The implementation of the process in accordance with the present invention is particularly easy, especially when the elevators are used. Specifically, it then suffices to modify the characteristic of the aircraft giving the deflection of the elevators as a function of the deflection order instructed. As will be seen hereinafter, numerous modifications of this characteristic are possible for implementing the invention.

BRIEF DESCRIPTION OF THE DRAWINGS

The figures of the appended drawing will elucidate the manner in which the invention may be embodied. In these figures, identical references denote similar elements.

FIG. 2 illustrates, in three customary successive phases, the takeoff of said aircraft.

FIGS. 3A and 3B show an exemplary customary positioning of the adjustable horizontal tailplane and of the elevators attached thereto, respectively before and starting from the takeoff rotation.

DETAILED DESCRIPTION OF THE INVENTION

Figure 1:
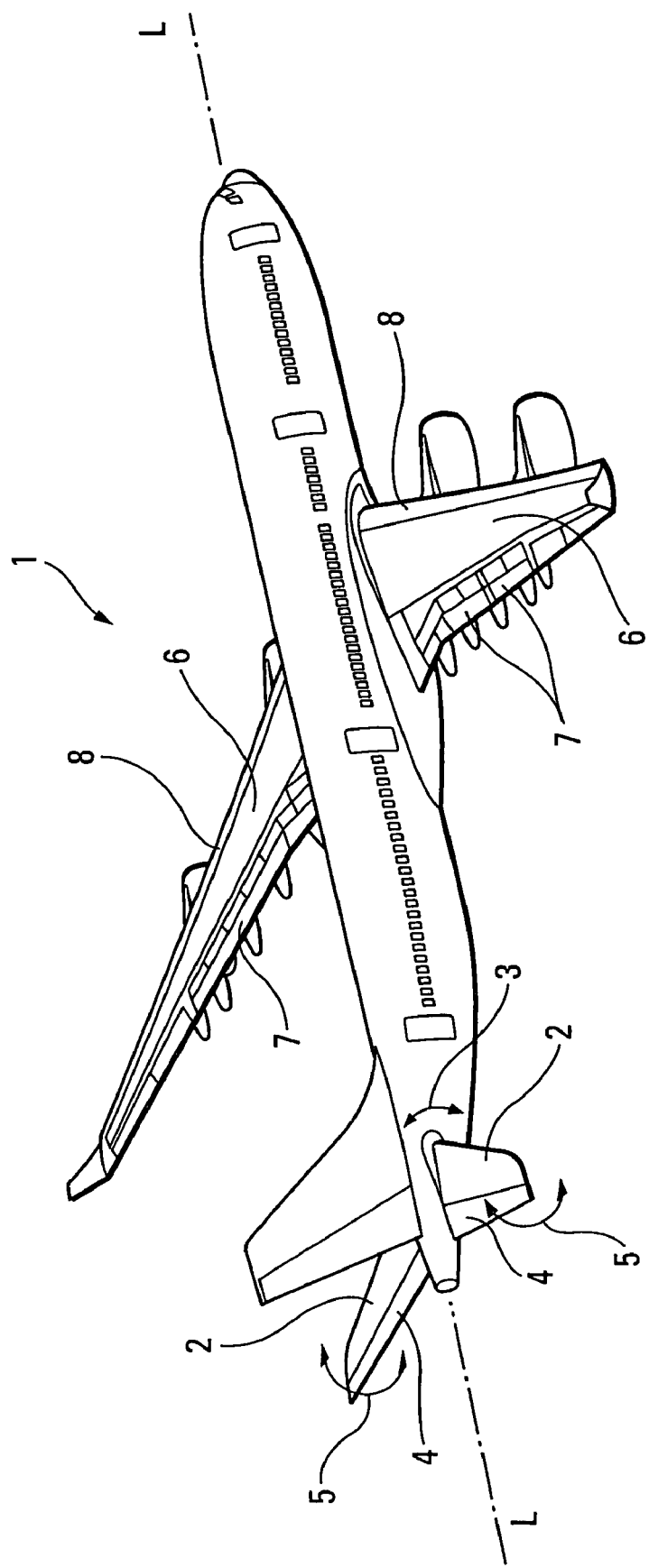
FIG. 1 shows, in diagrammatic perspective, a wide-bodied civil aircraft provided with an adjustable horizontal tailplane.

The wide-bodied airplane 1, shown diagrammatically by FIG. 1, exhibits a longitudinal axis L-L and comprises a horizontal tailplane 2 that can be adjusted in inclination, as is illustrated by the double arrow 3. To the rear edge of said adjustable horizontal tailplane 2 are hinged elevators 4 that can turn with respect to said tailplane 2, as is illustrated by the double arrows 5.

Moreover, on its wings 6, the airplane 1 comprises trailing edge flaps 7 and leading edge slats 8.

In the known art, when the airplane 1, resting on the runway 9, prepares for takeoff, the speed VR at which the takeoff rotation will have to begin and which must lie in a range of values of speed imposed by regulatory provisions on the one hand, and an angle of deflection iH for the adjustable horizontal tailplane 2 on the other hand, are determined as a function of at least certain of the above-mentioned parameters, and the inclination of the tailplane with respect to said longitudinal axis L-L is adjusted to this value iH (generally nose-up) (see FIG. 3A) in such a way that said adjustable horizontal tailplane 2 is able, during takeoff, to exert an appropriate pitch action for aiding takeoff.

Illustrated in FIG. 2 are the three customary phases I, II and III experienced by the airplane 1 during its liftoff.

In phase I, the airplane 1 is rolling over the runway 9, accelerating so as to reach the predetermined rotation speed VR.

During this acceleration phase I, the trailing edge flaps 7 and the leading edge slats 8 are deployed in customary fashion (not represented), the adjustable horizontal tailplane 2 is inclined by the angle iH and the elevators 4 are, for example, in their position that is aerodynamically in alignment with said adjustable horizontal tailplane 2. In this customary configuration, illustrated by FIG. 3A, the assembly of said adjustable horizontal tailplane 2 and of the elevators 4 engenders a nose-up aerodynamic force producing a nose-up pitching moment for the airplane 1.

Still in a customary manner, when the aircraft 1 by rolling over the runway 9 reaches the rotation speed VR (phase II in FIG. 2), the pilot actuates the elevators 4 so as to make them take a nose-up position, defined by a value δq of the angle of deflection with respect to the adjustable horizontal tailplane 2 (see FIG. 3B). The assembly of said adjustable horizontal tailplane 2 and of the elevators 4 then engenders a nose-up aerodynamic force and a nose-up pitching moment, respectively greater than those engendered in the arrangement of FIG. 3A and able to cause the liftoff of the airplane 1.

During this liftoff, the adjustable horizontal tailplane 2 is held in its inclined position defined by the angle iH with the elevators 4 nose-up deflected by the angle δq (FIG. 3B).

After stabilization of the airplane 1 on an inclined trajectory (phase III in FIG. 2), the adjustable horizontal tailplane 2 is brought back parallel to the axis L-L, with the elevators 4 in direct aerodynamic alignment with said tailplane 2.

In the process for aiding takeoff in accordance with the present invention, in addition to the predetermination of the rotation speed VR, a reference speed VRref is chosen arbitrarily in said range of values of speed imposed by the regulatory provisions governing the operation of civil transport airplanes, and for this arbitrary reference speed VRref, the predetermined value iH1 of the angle of deflection of said adjustable horizontal tailplane 2 is determined (see FIGS. 4 and 5), solely as a function of the longitudinal position of the center of gravity CG along the axis L-L, obtained by computing the distance cg from said center of gravity to an origin O (see FIG. 2). Thereafter, the deviation existing between the values VR and VRref is determined (either by the ratio VR/VRref, or by the difference VR−VRref) and the pitch action which would be exerted by the adjustable horizontal tailplane 2 deflected by the angle iH1 is corrected, before or during rotation, as is explained hereinafter, with regard to FIGS. 4 and 5.

To simplify the implementation of the invention, the latter makes provision, in an advantageous embodiment, for the reference rotation speed VRref to be chosen equal to the smallest speed of this rotation speed range imposed by the regulatory provisions for the airplane 1 under the takeoff conditions. Thus, the actual rotation speed VR instructed by the pilot is compulsorily equal to or greater than the reference rotation speed VRref, so that the difference VR−VRref is zero or positive and that the ratio VR/VRref is equal to or greater than 1. It follows that, regardless of the value of VR (within said imposed speed range) other than VRref, the correction performed by the present invention is always in the nose-down direction. On the other hand, if VR is equal to VRref, the correction introduced by the invention is zero.

Under these conditions, the reference rotation speed VRref may be chosen equal to the product K×VS1g, in which K is a coefficient greater than 1 and VS1g is the speed at which said aircraft 1 stalls when it is flying horizontally with a configuration of the leading edge slats 8 and of the trailing edge flaps 7 which is similar to that used for takeoff. This coefficient K depends on the ratio of the thrust of the airplane 1 on takeoff to the weight of said airplane. Its mean value is around 1.11.

The pitch command correction in accordance with the present invention may be introduced by action on the adjustable horizontal tailplane 2 (see FIG. 4), by action on the elevators 4 (see FIG. 5) or by action on the adjustable horizontal tailplane 2 and on the elevators 4.

Figure 4:
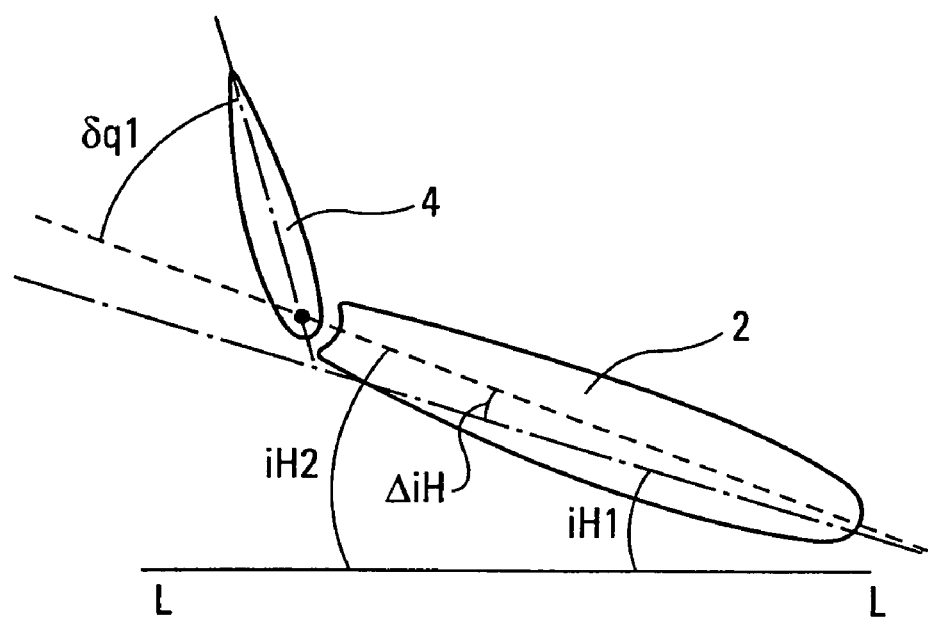
FIG. 4 illustrates a first exemplary implementation of the process in accordance with the present invention.

In the case where said correction is obtained by the implementation of the adjustable horizontal tailplane 2, a correction angle ΔiH is added to the angle iH1, preferably before the acceleration phase I. Thus, during this acceleration phase I, the adjustable horizontal tailplane 2 is inclined by the angle iH2=iH1+ΔiH as illustrated in FIG. 4. If the difference VR−VRref is used, that is to say in the example above VR−K×VS1g, as parameter to estimate the deviation between said values VR and VRref, the correction angle ΔiH is advantageously of the type $$\Delta iH = K1 \times (VR - K \times VS1g)$$

in which expression K1 is a coefficient dependent on the reference speed VRref, the longitudinal position cg of the center of gravity CG and the configuration of the trailing edge flaps 7 and of the leading edge slats 8. Its mean value is of the order of 0.16°/kt.

Thereafter, when at the end of the acceleration phase I, the aircraft 1 reaches the rotation speed VR, the pilot deflects the elevators 4 by an angle δq1 (see FIG. 4) so as to initiate the rotation of phase II.

Figure 5:
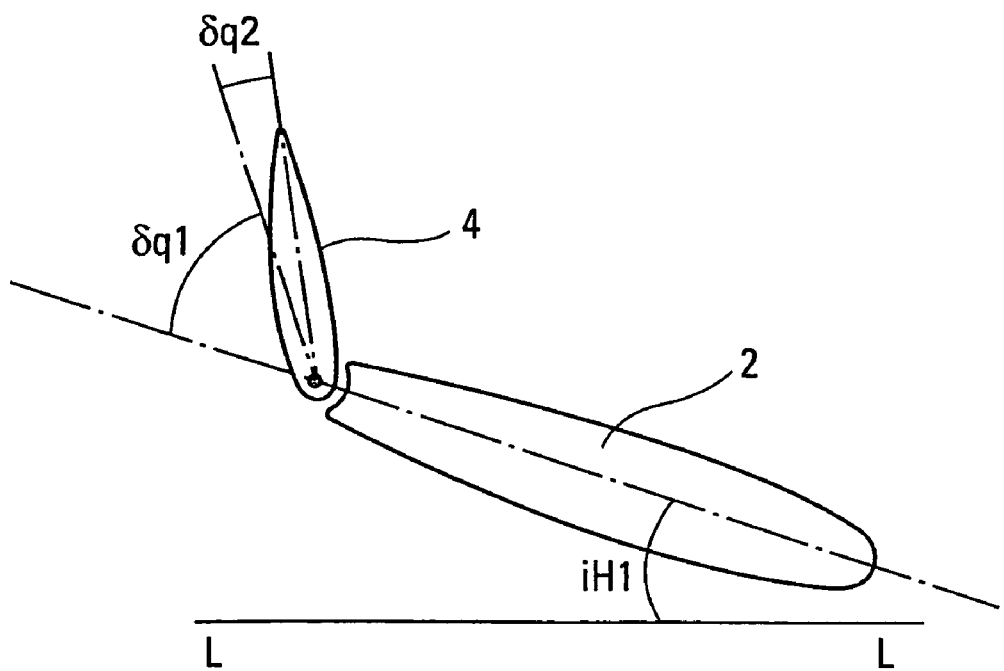
FIG. 5 illustrates a second exemplary implementation of the process in accordance with the present invention.

If, as a variant, said correction in accordance with the present invention is obtained by the implementation of the elevators 4, a correction angle δq2 is added to the angle δq1 right from the start of rotation so as to take account of the fact that VR is greater than VRref (see FIG. 5). By taking the features mentioned hereinabove into consideration, the correction angle δq2 is advantageously of the type $$\delta q2 = K2(VR - K \times VS1g)$$

in which expression K2 is a coefficient dependent on the reference speed VRref, the longitudinal position cg of the center of gravity CG and the configuration of the trailing edge flaps 7 and of the leading edge slats 8. If said adjustable horizontal tailplane 2 is n times more effective, as regards the pitch command, than said elevators 4, K2 is equal to n times K1.

From the foregoing, it will be readily understood that the pitch correction in accordance with the present invention may be implemented by combining the actions of the adjustable horizontal tailplane 2 and of the elevators 4.

The variant of the process in accordance with the present invention using the elevators 4 is particularly easy to implement on the airplane 1.

Figure 6:
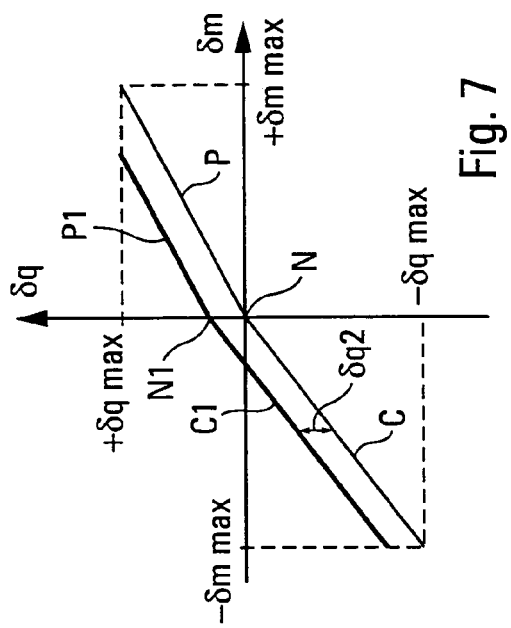
FIG. 6 shows a customary, known exemplary chart illustrating the variation of the angle of deflection of the elevators of an airplane as a function of the deflection order instructed.

It is in fact known that, as is illustrated in FIG. 6, the characteristic of the airplane 1 giving, in a system of rectangular axes, the angle of deflection $\delta q$ of the elevators 4 as a function of the deflection order $\delta m$ on the stick comprises a nose-down part P, generally linear, and a nose-up part C, generally also linear, said nose-down and nose-up parts P and C being linked together at a neutral point N.

Thus, for a variation of the nose-down deflection order $\delta m$ between 0 and a maximum value $+\delta mmax$ (and conversely between $+\delta mmax$ and 0), the nose-down deflection of the elevators 4 varies between 0 and a maximum value $+\delta qmax$ (and conversely between $+\delta qmax$ and 0). Likewise, for a variation of the nose-up deflection order $\delta m$ between 0 and a maximum value $-\delta mmax$ (and conversely between $-\delta mmax$ and 0), the nose-up deflection of the elevators 4 varies between 0 and a maximum value $-\delta qmax$ (and conversely between $-\delta qmax$ and 0).

Figure 7:
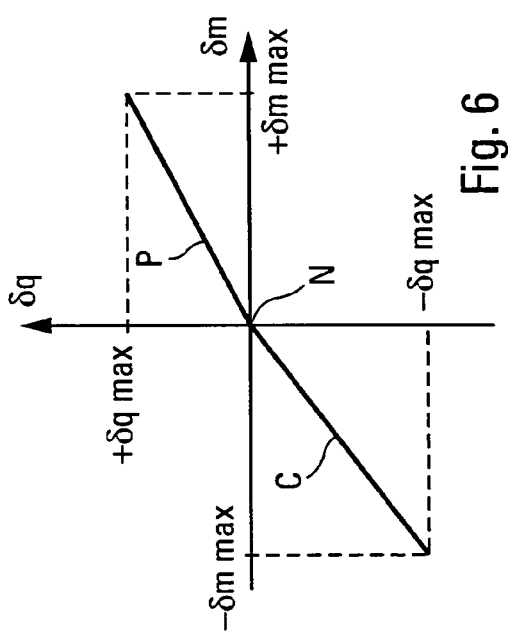
FIGS. 7, 8 and 9 show variants of the chart of FIG. 6 for implementing the second example of the process of the invention, illustrated by FIG. 5.

In the exemplary implementation of the invention illustrated by FIG. 7, the known characteristic C, P shown by FIG. 6 has been modified by supplementing it with the correction angle $\delta q2$ (FIG. 5) both on the nose-down part P and on the nose-up part C. A modified characteristic C1, P1 is thus obtained, specific to the present invention and resulting from a translation of amplitude $\delta q2$ in the direction $+\delta qmax$, parallel to the $\delta q$ axis. The neutral point N also undergoes such a translation, so that the resulting point N1 is no longer neutral since for the abscissa $\delta m=0$, its ordinate is equal to $\delta q2$.

Figure 8:
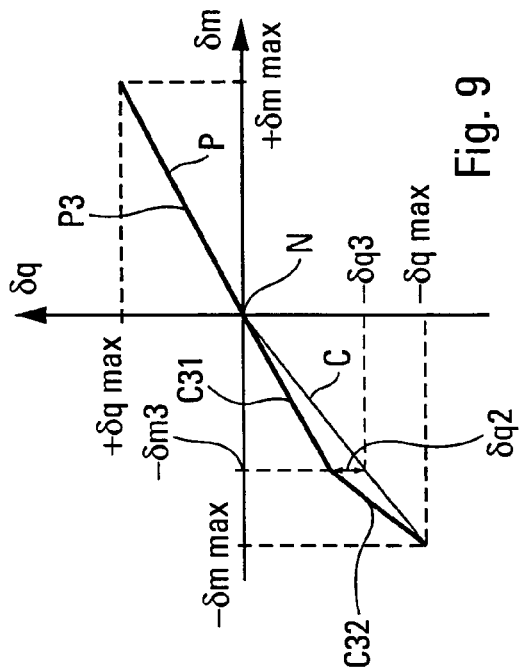

In the second exemplary implementation illustrated by FIG. 8, the point of the nose-up part C, defined by the coordinates $-\delta m3$ and $-\delta q3$ and corresponding to the angle of deflection $\delta q1$ used for the rotation (see FIG. 3B), is introduced. For example, $-\delta m3$ and $-\delta q3$ are respectively equal to two thirds of $-\delta mmax$ and $-\delta qmax$. In this example, the modified nose-up part comprises, between $-\delta m3$ and 0, a first portion C21 having undergone, like the nose-up part C1 of FIG. 7, a translation of amplitude $\delta q2$ in the direction $+\delta qmax$, parallel to the $\delta q$ axis, and a second portion C22, inclined, joining the point $-\delta m3$, $-\delta q3+\delta q2$ to the point $-\delta mmax$, $-\delta qmax$. In this second example, the neutral point N is displaced to N2 (similar to N1) and the nose-down part P2 of the modified characteristic is inclined and meets the point N2 at the point $+\delta mmax$, $+\delta qmax$.

Figure 9:
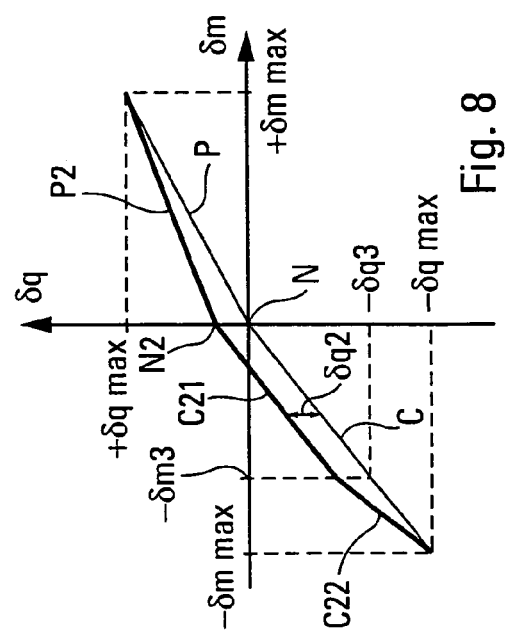

The modified characteristic of the third example of FIG. 9 comprises a nose-down part P3 identical to the part P of the characteristic C, P of FIG. 6, a first nose-down part portion C31 joining the point $-\delta m3$, $-\delta q3+\delta q2$ to the neutral point N and a second nose-down part portion C32 identical to the portion C22 of FIG. 8.

Of course, the three examples of modified characteristics C1, P1-C21, C22, P2-C31, C32, P3 given by FIGS. 7, 8 and 9 are not limiting, numerous other modifications of the characteristic C, P being conceivable.

In the customary case where the airplane 1 comprises a computer (not represented) in which a takeoff law is stored, it is advantageous for the process in accordance with the present invention to be integrated into said law.

The invention claimed is:

1. A process for aiding the takeoff of an aircraft comprising trailing edge flaps, leading edge slats, and an adjustable horirontal tailplane to which are hinged elevators, said process comprising:

before takeoff, when the aircraft rests on a runway preparing for the takeoff:
  a) predetermining a value VR of speed of the aircraft at which the takeoff rotation must begin,
  b) determining a reference speed VRref which is equal to the product K×VS1g, in which K is a coefficient greater than 1 and VS1g is the speed at which said aircraft stalls when it is flying horizontally with a configuration of the leading edge slats and of the trailing edge flaps which is similar to that used for takeoff,
  c) for this reference speed VRref, determining a fixed value iH1 of the angle of deflection of said adjustable horizontal tailplane solely as a function of the longitudinal position of the center of gravity of said aircraft on takeoff,
  d) deflecting said adjustable horizontal tailplane by an angle whose value is equal to said fixed value iH1,
  e) determining the difference VR–VRref between said rotation speed VR and said reference speed VRref, and
  f) determining a fixed pitch correction angle $\Delta iH$ for said adjustable horizontal tailplane or a fixed pitch correction angle $\delta q2$ for said elevators as a function of said difference VR–VRref; and before or during the takeoff rotation:
  g) applying: (1) said fixed pitch correction angle $\Delta iH$ to said adjustable horizontal tailplane, (2) said fixed pitch correction angle $\delta q2$ to said elevators, or (3) part of said fixed pitch correction angle $\Delta iH$ to said adjustable horizontal tailplane and part of said fixed pitch correction angle $\delta q2$ to said elevators.

2. The process as claimed in claim 1, wherein said fixed pitch correction angle $\Delta iH$ is applied to said adjustable horizontal tailplane.

3. The process as claimed in claim 2, wherein part of said fixed pitch correction angle $\Delta iH$ is applied to said adjustable horizontal tailplane and,
  part of said fixed pitch correction angle $\delta q2$ is applied to said elevators.

4. The process as claimed in claim 2, wherein the value $\Delta iH$ is of the type $$\Delta iH = K1 \times (VR - K \times VS1g)$$

in which expression K1 is a coefficient dependent on the reference speed VRref, the longitudinal position of the center of gravity and the configuration of the trailing edge flaps and of the leading edge slats.

5. The process as claimed in claim 4, wherein the mean value of K1 is of the order of 0.16°/kt.

6. The process as claimed in claim 4, applied to an aircraft in which said adjustable horizontal tailplane is n times more effective, as regards the fixed pitch correction angles $\Delta iH$ and $\delta 2$, than said elevators, wherein K2=n×K1.

7. The process as claimed in claim 1, wherein said fixed pitch correction angle $\delta q2$ is applied to said elevators.

8. The process as claimed in claim 7, wherein said angle $\delta q2$ is of the type $$\delta q2 = K2 \times (VR - K \times VS1g)$$

in which expression K2 is a coefficient dependent on the reference speed VRref, the longitudinal position of the center of gravity and the configuration of the trailing edge flaps and of the leading edge slats.

9. The process as claimed in claim 8, in which the characteristic tied to the airplane and giving the deflection of the elevators as a function of the order of deflection of said elevators comprises a nose-down part and a nose-up part that are linked together at a neutral point, wherein said characteristic is modified by supplementing it with said additional angle δq2.

10. The process as claimed in claim 9, wherein said additional angle δq2 is added at at least one point of said nose-up part.

11. The process as claimed in claim 1, wherein said speed difference between said values VR and VRref is estimated by the ratio between them.

12. The process as claimed in claim 1, wherein said speed difference between said values VR and VRref is estimated by the difference between them.

13. The process as claimed in claim 1, wherein the coefficient K depends on the ratio of the thrust of the aircraft at takeoff to the weight of said aircraft.

14. The process as claimed in claim 13, wherein the coefficient K exhibits a mean value of around 1.11.

* * * * *